(12) United States Patent
Sullivan et al.

(10) Patent No.: US 8,984,407 B2
(45) Date of Patent: Mar. 17, 2015

(54) METHODS AND INTERFACES FOR DISPLAYING PERFORMANCE DATA RELATED TO A CURRENT REMOTE ACCESS SESSION

(75) Inventors: Darin Sullivan, Santa Barbara, CA (US); Shadi Muklashy, Pasadena, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 623 days.

(21) Appl. No.: 13/323,333

(22) Filed: Dec. 12, 2011

(65) Prior Publication Data

US 2012/0084659 A1 Apr. 5, 2012

Related U.S. Application Data

(63) Continuation of application No. 11/532,422, filed on Sep. 15, 2006, now Pat. No. 8,078,972.

(51) Int. Cl.
*G06F 15/177* (2006.01)
*H04L 12/26* (2006.01)
*H04L 12/24* (2006.01)
*H04L 29/08* (2006.01)

(52) U.S. Cl.
CPC ............... *H04L 43/16* (2013.01); *H04L 41/22* (2013.01); *H04L 43/0852* (2013.01); *H04L 67/36* (2013.01); *H04L 67/025* (2013.01)
USPC .......................................... 715/736; 715/734

(58) Field of Classification Search
USPC ................... 715/744, 745, 736, 734
See application file for complete search history.

(56) References Cited

U.S. PATENT DOCUMENTS

| | | | |
|---|---|---|---|
| 4,736,369 A | 4/1988 | Barzilai et al. |
| 5,031,089 A | 7/1991 | Liu et al. |
| 5,309,555 A | 5/1994 | Akins et al. |
| 5,392,223 A | 2/1995 | Caci |
| 5,392,432 A | 2/1995 | Engelstad et al. |
| 5,432,932 A | 7/1995 | Chen et al. |
| 5,440,719 A | 8/1995 | Hanes et al. |
| 5,446,491 A | 8/1995 | Shibata et al. |
| 5,553,083 A | 9/1996 | Miller |
| 5,572,674 A | 11/1996 | Ernst |

(Continued)

FOREIGN PATENT DOCUMENTS

WO   WO 0227552   4/2002

OTHER PUBLICATIONS

US 5,715,404, 02/1998, Katseff et al. (withdrawn).

(Continued)

*Primary Examiner* — Rashawn Tillery
(74) *Attorney, Agent, or Firm* — BainwoodHuang

(57) ABSTRACT

A graphical user interface displays performance data related to a communication session between a first computing device and a second computing device. The graphical user interface comprises a first graphical element and a second graphical element. The first graphical element has a number of sections that represent respective physical portions of a connection between the first computing device and the second computing device. Each of the sections displays the performance data of a current session for that respective physical section. The second graphical element displays corresponding performance data for a predetermined number of previous sessions between the first computing device and the second computing device.

20 Claims, 13 Drawing Sheets

(56) References Cited

U.S. PATENT DOCUMENTS

| | | |
|---|---|---|
| 5,633,868 A | 5/1997 | Baldwin et al. |
| 5,657,390 A | 8/1997 | Elgamal et al. |
| 5,684,945 A | 11/1997 | Chen et al. |
| 5,727,002 A | 3/1998 | Miller |
| 5,754,939 A | 5/1998 | Herz et al. |
| 5,764,235 A | 6/1998 | Hunt et al. |
| 5,802,292 A | 9/1998 | Mogul |
| 5,826,025 A | 10/1998 | Gramlich |
| 5,835,724 A | 11/1998 | Smith |
| 5,845,265 A | 12/1998 | Woolston |
| 5,852,717 A | 12/1998 | Bhide et al. |
| 5,864,678 A | 1/1999 | Riddle |
| 5,867,494 A | 2/1999 | Krishnaswamy et al. |
| 5,909,559 A | 6/1999 | So |
| 5,911,044 A | 6/1999 | Lo et al. |
| 5,918,020 A | 6/1999 | Blackard et al. |
| 5,956,027 A | 9/1999 | Krishnamurthy |
| 5,958,009 A | 9/1999 | Friedrich et al. |
| 5,961,588 A | 10/1999 | Cooper et al. |
| 5,999,525 A | 12/1999 | Krishnaswamy et al. |
| 6,006,264 A | 12/1999 | Colby et al. |
| 6,023,724 A | 2/2000 | Bhatia et al. |
| 6,038,596 A | 3/2000 | Baldwin et al. |
| 6,052,120 A | 4/2000 | Nahi et al. |
| 6,081,829 A | 6/2000 | Sidana |
| 6,088,451 A | 7/2000 | He et al. |
| 6,167,432 A | 12/2000 | Jiang |
| 6,189,033 B1 | 2/2001 | Jin et al. |
| 6,226,750 B1 | 5/2001 | Trieger |
| 6,246,758 B1 | 6/2001 | Low |
| 6,249,291 B1 | 6/2001 | Popp et al. |
| 6,266,709 B1 | 7/2001 | Gish |
| 6,272,539 B1 | 8/2001 | Cuomo et al. |
| 6,272,556 B1 | 8/2001 | Gish |
| 6,289,382 B1 | 9/2001 | Bowman-Amuah |
| 6,304,893 B1 | 10/2001 | Gish |
| 6,317,761 B1 | 11/2001 | Landsman et al. |
| 6,332,163 B1 | 12/2001 | Bowman-Amuah |
| 6,335,927 B1 | 1/2002 | Elliott et al. |
| 6,339,832 B1 | 1/2002 | Bowman-Amuah |
| 6,345,239 B1 | 2/2002 | Bowman-Amuah |
| 6,400,996 B1 | 6/2002 | Hoffberg et al. |
| 6,415,329 B1 | 7/2002 | Gelman et al. |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,519,571 B1 | 2/2003 | Guheen et al. |
| 6,519,643 B1 | 2/2003 | Foulkes et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,539,429 B2 | 3/2003 | Rakavy et al. |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,557,168 B1 | 4/2003 | Czajkowski |
| 6,567,813 B1 | 5/2003 | Zhu et al. |
| 6,567,974 B1 | 5/2003 | Czajkowski |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,822 B1 | 8/2003 | Beams et al. |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,687,745 B1 | 2/2004 | Franco et al. |
| 6,704,012 B1 | 3/2004 | Lefave |
| 6,731,625 B1 | 5/2004 | Eastep et al. |
| 6,754,181 B1 | 6/2004 | Elliott et al. |
| 6,801,499 B1 | 10/2004 | Anandakumar et al. |
| 6,842,906 B1 | 1/2005 | Bowman-Amuah |
| 6,850,491 B1 | 2/2005 | Firou et al. |
| 6,851,114 B1 | 2/2005 | Czajkowski |
| 6,901,586 B1 | 5/2005 | Czajkowski |
| 6,909,708 B1 | 6/2005 | Krishnaswamy et al. |
| 6,938,247 B2 | 8/2005 | Czajkowski |
| 6,941,359 B1 | 9/2005 | Beaudoin et al. |
| 6,988,126 B2 | 1/2006 | Wilcock et al. |
| 6,996,605 B2 | 2/2006 | Low et al. |
| 7,000,019 B2 | 2/2006 | Low et al. |
| 7,013,290 B2 | 3/2006 | Ananian |
| 7,013,327 B1 | 3/2006 | Hickman et al. |
| 7,013,329 B1 | 3/2006 | Paul et al. |
| 7,023,979 B1 | 4/2006 | Wu et al. |
| 7,035,907 B1 | 4/2006 | Decasper et al. |
| 7,047,279 B1 | 5/2006 | Beams et al. |
| 7,051,080 B1 | 5/2006 | Paul et al. |
| 7,069,234 B1 | 6/2006 | Cornelius et al. |
| 7,092,370 B2 | 8/2006 | Jiang et al. |
| 7,100,195 B1 | 8/2006 | Underwood |
| 7,124,101 B1 | 10/2006 | Mikurak |
| 7,130,807 B1 | 10/2006 | Mikurak |
| 7,142,820 B1 | 11/2006 | Rajala |
| 7,143,089 B2 | 11/2006 | Petras et al. |
| 7,145,898 B1 | 12/2006 | Elliott |
| 7,149,698 B2 | 12/2006 | Guheen et al. |
| 7,152,092 B2 | 12/2006 | Beams et al. |
| 7,165,041 B1 | 1/2007 | Guheen et al. |
| 7,167,844 B1 | 1/2007 | Leong et al. |
| 7,188,183 B1 | 3/2007 | Paul et al. |
| 7,222,269 B2 | 5/2007 | Kurinami et al. |
| 7,315,985 B1 | 1/2008 | Gauvin et al. |
| 7,397,778 B2 | 7/2008 | Jay et al. |
| 7,496,040 B2 | 2/2009 | Seo et al. |
| 7,587,675 B2 | 9/2009 | Cunningham et al. |
| 2002/0035451 A1 | 3/2002 | Rothermel |
| 2003/0126254 A1 | 7/2003 | Cruickshank et al. |
| 2003/0140159 A1 | 7/2003 | Campbell |
| 2003/0191812 A1 | 10/2003 | Agarwalla et al. |
| 2003/0191867 A1 | 10/2003 | Czajkowski |
| 2003/0226038 A1 | 12/2003 | Raanan et al. |
| 2004/0073512 A1 | 4/2004 | Maung |
| 2005/0080850 A1 | 4/2005 | Salesky et al. |
| 2005/0088976 A1 | 4/2005 | Chafle et al. |
| 2005/0219151 A1 | 10/2005 | Li et al. |
| 2005/0264647 A1 | 12/2005 | Rzeszewski et al. |
| 2005/0265253 A1 | 12/2005 | Swift et al. |
| 2005/0289395 A1 | 12/2005 | Katsuyama et al. |
| 2006/0015570 A1 | 1/2006 | Khemani et al. |
| 2006/0029037 A1 | 2/2006 | Chen et al. |
| 2006/0149407 A1 | 7/2006 | Markham et al. |
| 2008/0163064 A1 | 7/2008 | Swildens et al. |
| 2008/0201642 A1 | 8/2008 | Chong et al. |
| 2009/0232016 A1 | 9/2009 | Pruthi et al. |

OTHER PUBLICATIONS

"CU-SeeMe Software Product," Brought to you by the CU-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean

(56) References Cited

OTHER PUBLICATIONS

Resources Conservation and Assessment for Operation of the CU-SeeMe System, 26 pages (1995).
Abdel-Waha et al., "XTV: A Framework for Sharing X Window Clients in Remote Synchronous Collaboration," IEEE Conference, pp. 1-15 (1991).
Bolot et al., "Scalable Feedback Control for Multicast Video Distribution in the Internet," SIGCOMM 94, London England, pp. 58-67 (1994).
Border et al., "Performance Enhancing Proxies Intended to Mitigate Link-Related Degradations," Network Working Group, the Internet Society, RFC3135, 45 pages (2001).
Chen et al., "Real Time Video and Audio in the World Wide Web", 1995.
Cox, "Global Schoolhouse Project," http://www.virtualschool.edu/mon/academia (2010).
Crowley et al., "MMConf: An Infrastructure for Building Shared Multimedia Applications," Proceedings of the 1990 ACM Conference on Computer—Supported Cooperative Work, pp. 329-342 (1990).
Delgrossi et al., "Media Scaling for Audiovisual Communication with the Heidelberg Transport System," Conference Proceedings of the first ACM International Conference on Multimedia, pp. 99-104 (1993).
Dorcey, "CU-SeeMe Desktop Videoconferencing Software," Connexions the Interoperability Report, 9: 42-45 (1995).
Ensor et al., "Control Issues in Multimedia Conferencing," IEEE Conference, pp. 133-143 (1991).
Ensor et al., "The Rapport Multimedia Conferencing System—A Software Overview," Proceedings of the 2nd IEEE Conference, pp. 52-58 (1988).
Maly et al., "Mosaic + XTV = CoReview," Computer Networks and ISDN Systems, pp. 1-19 1995.
McCanne et al., "Receiver-Driven Layered Multicast," ACM SIGCOMM, pp. 1-14 (1996).
Sattler, "Internet TV with CU-SeeMe", Book, 323 pages (1995).
Savetz et al., "MBONE: Multicasting Tomorrow's Internet," IDG Books Worldwide, Inc., (1996).

US 8,984,407 B2

METHODS AND INTERFACES FOR DISPLAYING PERFORMANCE DATA RELATED TO A CURRENT REMOTE ACCESS SESSION

CROSS REFERENCE TO RELATED APPLICATIONS

The present application is a continuation of U.S. application Ser. No. 11/532,422, filed Sep. 15, 2006, the disclosure of which is incorporated by reference herein.

FIELD OF THE INVENTION

The present invention generally relates to monitoring and displaying performance data related to transmission of information in data communication networks. In particular, the present invention relates to methods and interfaces for displaying performance data related to a current remote access session.

BACKGROUND OF THE INVENTION

Measuring the true end-user interaction experience with applications operating within a distributed computing environment is a complicated task. As used herein, the interaction experience refers to the time between a display change on a host machine and updating a display to an end-user reflecting that change. There are several factors that contribute to the interaction experience: client performance, client load, network characteristics, network performance, server performance, and server load. Each of these factors may impact the interaction experience by varying amounts, and recommendations for optimizing the performance of each may vary. A method for providing users and developers with both information regarding performance data for the varying components in a client-host connection and with recommendations needed to improve the interaction experience would be desirable.

Furthermore, generating an interface for providing meaningful feedback to an end user creates additional complications. Conventional systems may provide rudimentary graphical displays, for example, two-dimensional graphs plotting usage as a function of time. Typical systems may display to a user a graphical history of computer usage or page file usage over a period of time, and may provide statistics such as a number of threads or processes executing in a period of time, or a percentage of network utilization over a period of time. However, these systems typically lack the ability to interactive provide information to users seeking to improve or optimize usage. Nor do these systems typically provide an analysis for the user of the delay introduced into a connection by particular components of a connection between the user and another network node. Methods and systems providing a user with interactive, dynamic displays and recommendations for connection optimization would be desirable.

SUMMARY OF THE INVENTION

In one aspect, a graphical user interface displays performance data related to a communication session between a first computing device and a second computing device. The graphical user interface comprises a first graphical element and a second graphical element. The first graphical element has a plurality of sections that represent a respective physical portion of a connection between the first computing device and the second computing device. Each of the sections in the plurality of sections displays the performance data for a current session for that respective physical section. The second graphical element displays performance data for a predetermined number of previous sessions between the first computing device and the second computing device.

In one embodiment, a third graphical element indicates that that performance of one of the physical sections is below a predetermined threshold. In another embodiment, the third graphical element displays a recommendation to improve the performance of the physical section that is below the predetermined threshold. In still another embodiment, the third graphical element displays a rating of the performance of the current communication session relative to a predetermined number of communication sessions.

In one embodiment, the second graphical element dynamically displays the past performance of a respective physical portion of the connection when a pointer is placed over the same respective physical portion of the first graphical element. In another embodiment, a menu is configured to allow selection of one of the previous sessions for display as the first graphical element.

In another aspect, a graphical user interface displays performance data related to a communication session between a first computing device and a second computing device. The graphical user interface comprises a first graphical element and a second graphical element. The first graphical element comprises a plurality of sections that represent a respective physical portion of a connection between the first computing device and the second computing device, each of the sections displaying the performance data for a current session for that respective physical section. The second graphical element displays a rating of a performance of the current communication session relative to a predetermined number of communication sessions.

In one embodiment, a third graphical element indicates that performance of one of the physical sections is below a predetermined threshold. In another embodiment, the third graphical element displays a recommendation to improve the performance of the physical section that is below the predetermined threshold.

In still another aspect, a method for displaying performance data related to a current remote access session between a viewer computing device and a host computing device includes the step of generating a first graphical element having a plurality of sections that represent a respective physical portion of the remote access session. A second graphical element is retrieved for display of performance data for a predetermined number of previous remote access sessions.

In one embodiment, a third graphical element displays a rating of the performance data of the current communication session relative to a predetermined number of communication sessions. In another embodiment, the second graphical element dynamically displays the past performance of a respective physical portion of the connection when a pointer is placed over the same respective physical portion of the first graphical element. In still another embodiment, a graphical element indicates that performance of one of the physical sections is below a predetermined threshold. In yet another embodiment, a graphical element displays a recommendation for improving the performance of the physical section that is below the predetermined threshold.

BRIEF DESCRIPTION OF THE FIGURES

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1:
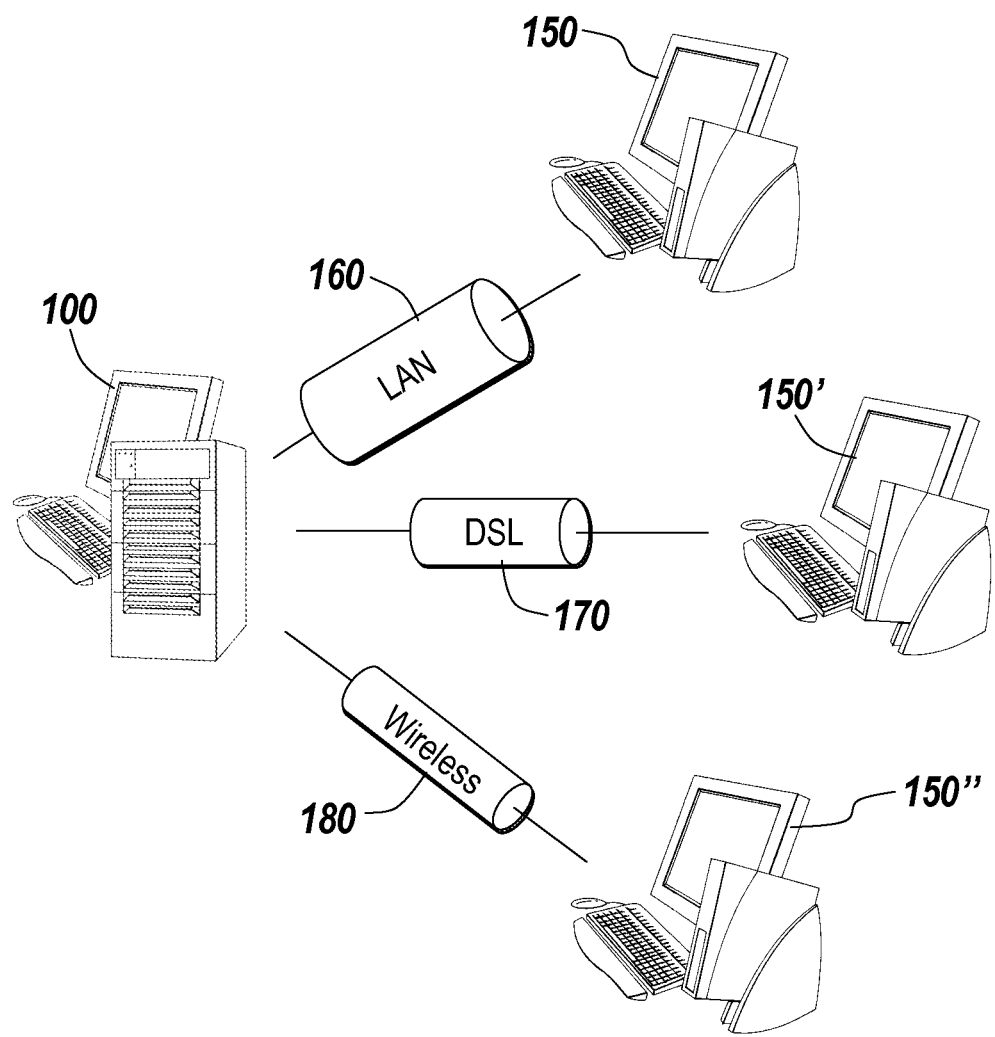
FIG. 1 is a block diagram of an embodiment of a network environment in which performance data related to a communication session between a first computing device and a second computing device is monitored.

Referring now to FIG. 1, an embodiment of a network environment is depicted. In brief overview, a networked system has a first node 100 in communication with a number of second nodes 150, 150', 150". In some embodiments, the first node 100 may be referred to as a host node 100 or a source node 100. In other embodiments, the second nodes 150, 150', 150" may be referred to as consumer nodes, clients, local machines, or endpoints.

As shown in FIG. 1, the second nodes 150, 150', 150" may communicate with the first node 100 via networks or differing bandwidth. In the embodiment shown in FIG. 1, second node 150 communicates with the first node 100 via a high-bandwidth network 160, such as a local area network (LAN). Second node 150" communicates with the first node 100 via a low-bandwidth network 180, such as a wireless network. Second node 150' communicates with the first node 100 via a network 170 having bandwidth between the low-bandwidth network 180 and the high-bandwidth network 160, such as a Digital Subscriber Line (DSL) connection. Although only one first node 100 and three second nodes 150, 150', 150" are depicted in the embodiment shown in FIG. 1, it should be understood that the system may provide multiple ones of any or each of those components. For example, in one embodiment, the system includes multiple, logically-grouped first nodes 100, each of which may be available to provide data to a second node 150, 150', 150".

The network connections 160, 170, 180 between the second nodes 150, 150', 150" and the first node 100 can be local area networks (LAN), metropolitan area networks (MAN), or a wide area network (WAN) such as the Internet. The network connections 160, 170, 180 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network connections 160, 170, 180 may comprise a wireless link, such as an infrared channel or satellite band. The topology of the network may be a bus, star, or ring network topology. The network topology may be of any such network or network topology as known to those ordinarily skilled in the art capable of supporting the operations described herein. The network connections 160, 170, 180 may comprise mobile telephone networks utilizing any protocol or protocols used to communicate among mobile devices, including AMPS, TDMA, CDMA, GSM, GPRS or UMTS. In some embodiments, different types of data may be transmitted via different protocols.

The first node 100 and the second nodes 150, 150', 150" may connect to the networks 160, 170, 180 through a variety of connections including standard telephone lines, LAN or WAN links (e.g., T1, T3, 56 kb, X.25), broadband connections (ISDN, Frame Relay, ATM), and wireless connections. Connections between the first node 100 and the second nodes 150, 150', 150" may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g and direct asynchronous connections). Although shown in FIG. 1 as separate networks, networks 160, 170, 180 may be combined in a single physical network.

The first node 100 and the second nodes 150, 150', 150" can communicate directly with each other or through an intermediary computing or communication device. For example, in some embodiments, a communication server may facilitate communications between the first and second nodes. The communications server can provide a secure channel using any number of encryption schemes to provide communications between the first node 100 and the second nodes 150, 150', 150". One remote access product that currently uses such a communication scheme is GOTOMYPC offered by Citrix Online, LLC of Santa Barbara Calif. Other such services can include, but are not limited too, CITRIX METAFRAME, provided by Citrix Systems, Inc. of Ft. Lauderdale Fla., WEBEX PCNOW offered by WebEx Communications, Inc. of Santa Clara Calif., LOGMEIN offered by 3am Labs, Inc. of Woburn, Mass., REMOTELY ANYWHERE also offered by 3am Labs, and PROVISION MANAGEMENT FRAMEWORK offered by Provision Networks.

The bandwidth and the latency of the networks 160, 170, 180 are factors that may affect the interaction experience of the end-user of the network environment. Other factors include the number of applications executing on the first node 100, the amount of data being executed (or load) of the applications of the first node 100, and the amount of processing (or load) being done by the second node 150. During operation, each of these factors fluctuates. As data is transmitted through the network, the amount of available bandwidth of the network is reduced. The number of requests to the first node 100 increases and decreases over time, thereby varying the load of the first node 100.

Figure 2A:
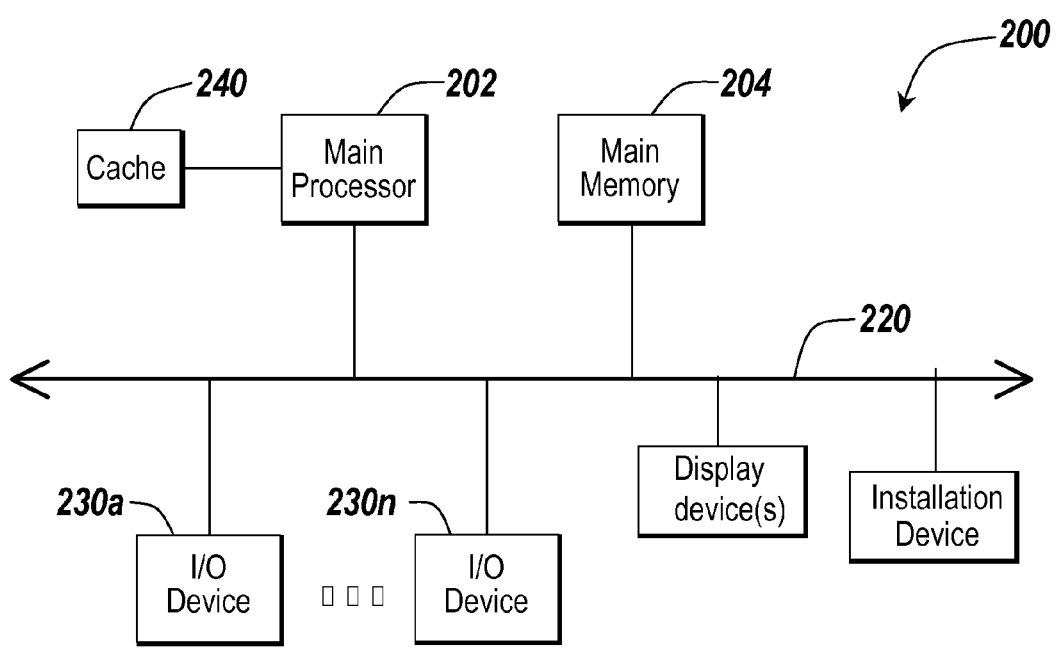
FIGS. 2A and 2B are block diagrams depicting embodiments of computers useful in connection with the methods and systems described herein.
Figure 2B:
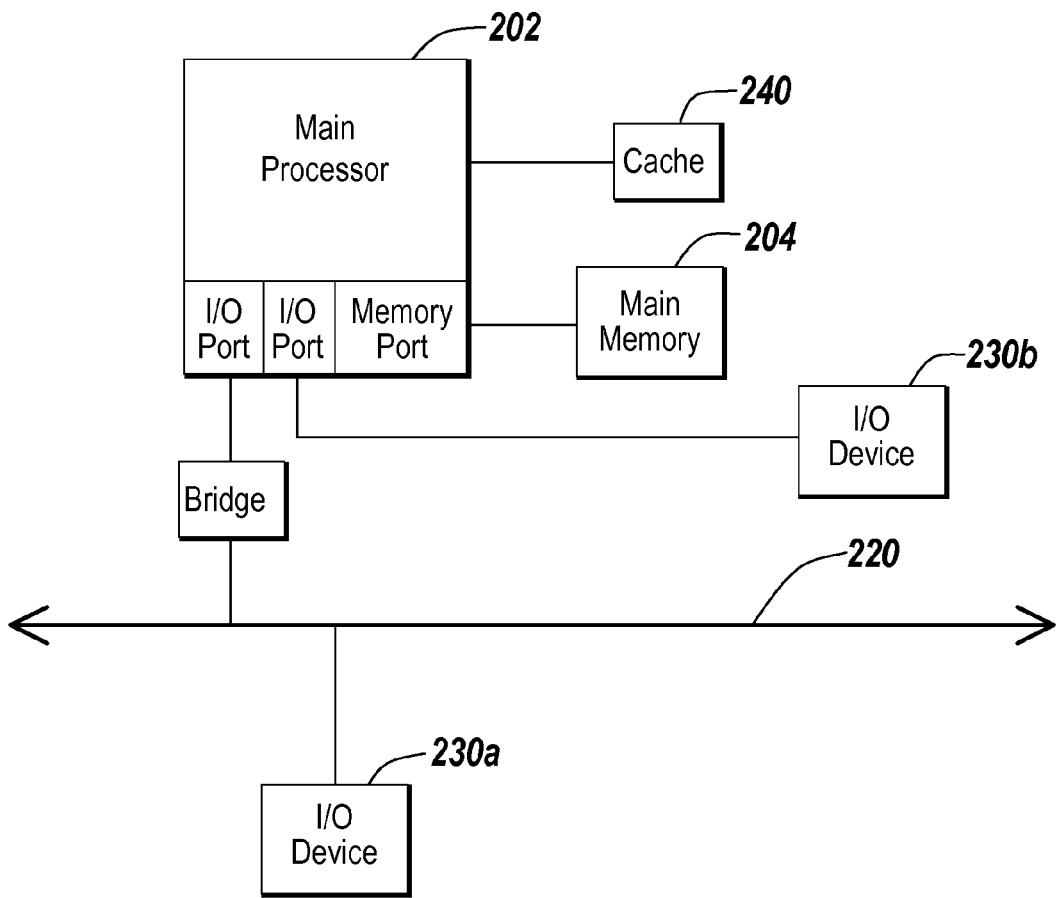

In some embodiments, the first node 100 and the second nodes 150, 150', 150" are provided as personal computers or computer servers, of the sort manufactured by the Hewlett-Packard Corporation of Palo Alto, Calif. or the Dell Corporation of Round Rock, Tex. FIGS. 2A and 2B depict block diagrams of a typical computer 200 useful as the first node 100 and the second nodes 150, 150', 150". As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computer 200 may be based on any of these processors, or any other processor capable of operating as described herein.

Main memory unit 204 may be one or more memory chips capable of storing data and allowing any storage location to be directly accessed by the microprocessor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 2B depicts an embodiment of a computer system 200 in which the main processor 202 communicates directly with I/O device 230b, via, for example, HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

The computer 200 may support an installation device, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as a client agent, or portion thereof. The computer 200 may further comprise a storage device, such as one or more hard disk drives or redundant arrays of independent disks, for storing an operating system and other related software, and for storing application software programs such as any program related to a client agent. Optionally, any of the installation devices could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In some embodiments, the computer 200 may comprise or be connected to audio devices. In other embodiments, the computer 200 may be connected to video devices. In still other embodiments, the computer 200 may comprise or be connected to multiple display devices, which each may be of the same or different type and/or form. As such, any of the I/O devices 230a-230n may comprise any type and/or form of suitable hardware, software, or combination of hardware and software to support, enable or provide for the connection and use of multiple display devices by the computer 200. For example, the computer 200 may include any type and/or form of video adapter, video card, driver, and/or library to interface, communicate, connect or otherwise use the display devices. In one embodiment, a video adapter may comprise multiple connectors to interface to multiple display devices. In other embodiments, the computer 200 may include multiple video adapters, with each video adapter connected to one or more of the display devices. In still other embodiments, any portion of the operating system of the computer 200 may be configured for using multiple displays. In yet other embodiments, one or more of the display devices may be provided by one or more other computing devices, such as second nodes 150', 150" connected to the second node 150, for example, via a network. These embodiments may include any type of software designed and constructed to use another computer's display device as a second display device for the computer 200.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 2A and 2B typically operate under the control of operating systems, which control scheduling of tasks and access to system resources. The computer 200 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computer 200 may have different processors, operating systems, and input devices consistent with the device. For example, in one embodiment the computer 200 is a Treo 180, 270, 1060, 600, 650, 700w, or 700p smart phone manufactured by Palm, Inc. In this embodiment, the Treo smart phone is operated under the control of the PalmOS operating system and includes a stylus input device as well as a five-way navigator device. In other embodiments the computer 200 is a mobile device, such as a JAVA-enabled cellular telephone or personal digital assistant (PDA), such as the Motorola Q, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In still other embodiments, the computer 200 is a Blackberry handheld or smart phone, such as the devices manufactured by Research In Motion Limited, including the Blackberry 7100 series, 8700 series, 7700 series, 7200 series, the Blackberry 7520, and the Blackberry Pearl 8100. In yet other embodiments, the computer 200 is a smart phone, Pocket PC, Pocket PC Phone, or other handheld mobile device supporting Microsoft Windows Mobile Software. Moreover, the computer 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the second nodes 150, 150', 150" connect to the first node 100 using any one of a number of well-known protocols from the GSM or CDMA families, such as W-CDMA. These protocols support commercial wireless communication services and W-CDMA, in particular, is the underlying protocol supporting i-Mode and mMode services, offered by NTT DoCoMo.

Figure 3A:
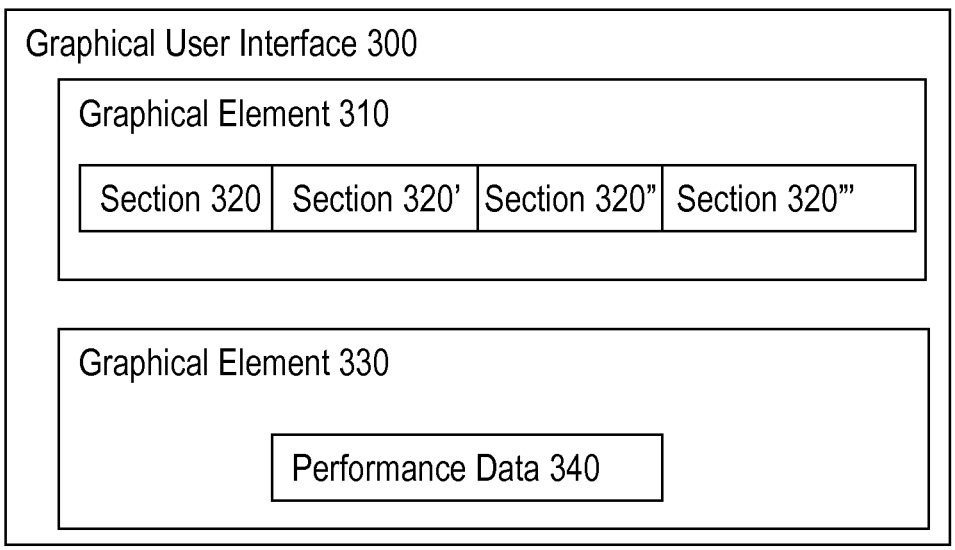
FIG. 3A is a block diagram depicting one embodiment of a graphical user interface that displays performance data related to a communication session between a first computing device and a second computing device.

Referring now to FIG. 3A, a block diagram depicts one embodiment of a graphical user interface that displays performance data related to a communication session between a first computing device and a second computing device. In brief overview, a graphical user interface 300 includes a graphical element 310 and a graphical element 330. The graphical element 310 includes a plurality of sections 320, 320', 320", 320'". The graphical element 330 includes a display of performance data 340. Although only two graphical elements are depicted, it should be understood that the graphical user interface may provide multiple ones of any or each of those, or other, graphical elements.

Referring to FIG. 3A, and in greater detail, the graphical user interface 300 displays performance data related to a communication session between a first computing device and a second computing device. The graphical element 310 has a plurality of sections 320 that each represents a respective physical portion of the connection between the first computing device and the second computing device. Each of the sections 320 displays the performance data for a current session for that respective physical section. In some embodiments, the plurality of sections 320 includes a section 320 for each segment of a physical connection between the first computing device and the second computing device. In other embodiments, the graphical element 310 displays only one section 320 representing an entire connection between the first computing device and the second computing device. Although only four sections 320, 320', 320", and 320'" are depicted in the plurality of sections 320 shown in FIG. 3A, the plurality of sections 320 may include any number of sections.

In one embodiment, the connection between the first computing device and the second computing device includes a physical portion between the first computing device and a network to which the first computing device connects. In another embodiment, the connection between the first computing device and the second computing device includes a physical portion between the second computing device and a network to which the second computing device connects. In still another embodiment, each section in the plurality of sections 320 represents a physical portion of the connection for a past session.

In one embodiment, a section 320 represents a host computing device. In another embodiment, a section 320' represents a network to which the host computing device connects. In still another embodiment, a section 320" represents a client computing device. In yet another embodiment, a section 320'" represents a network to which the client computing device connects. In some embodiments, a section 320'" represents an intermediate computing device forwarding communications between the host computing device and the client computing device. In one of these embodiments, a section 320"" represents a network to which the intermediate computing device connects.

In some embodiments, a section 320 represents a graphics component of the host computing device. In one of these embodiments, the section 320 represents a graphics card. In another of these embodiments, the section 320 represents a graphics device. In still another of these embodiments, the section 320 represents a graphics processor. In other embodiments, the section 320 represents a video component of the host computing device. In one of these embodiments, the section 320 represents a video card. In another of these embodiments, the section 320 represents a video device. In still another of these embodiments, the section 320 represents a video processor. In still other embodiments, the section 320 represents an audio component of the host computing device. In one of these embodiments, the section 320 represents an audio card. In another of these embodiments, the section 320 represents an audio device. In still another of these embodiments, the section 320 represents an audio processor.

In some embodiments, the section 320 represents a host computing device encoding data. In one of these embodiments, the section 320 represents the host computing device encoding video. In another of these embodiments, the section 320 represents the host computing device encoding audio. In still another of these embodiments, the section 320 represents the host computing device encoding graphics. In other embodiments, the section 320 represents a host computing device compressing data. In one of these embodiments, the section 320 represents the host computing device compressing video. In another of these embodiments, the section 320 represents the host computing device compressing audio. In still another of these embodiments, the section 320 represents the host computing device compressing graphics.

In some embodiments, the section 320 represents the client computing device decoding data. In one of these embodiments, the section 320 represents the client computing device decoding video. In another of these embodiments, the section 320 represents the client computing device decoding audio. In still another of these embodiments, the section 320 represents the client computing device decoding graphics. In other embodiments, the section 320 represents the client computing device decompressing data. In one of these embodiments, the section 320 represents the client computing device decompressing video. In another of these embodiments, the section 320 represents the client computing device decompressing audio. In still another of these embodiments, the section 320 represents the client computing device decompressing graphics. In still other embodiments, the section 320 represents a computing device encoding, compressing, encrypting, decoding, decompressing, or decrypting data.

In one embodiment, each of the plurality of sections 320 has a color. In another embodiment, each of the plurality of sections 320 has a distinct color. In still another embodiment, a color is dynamically assigned to a section in the plurality of sections 320. In yet another embodiment, the color assigned to section 320 provides an indication of a quality of a performance rating associated with the section 320. For example, if the section 320 represents a physical portion of a connection having a poor performance rating, the graphical user interface 300 may display the section 320 in red.

In some embodiments, the second graphical element 330 dynamically displays the past performance of a respective physical portion of the connection in the same color as the same respective physical portion of the first graphical element 310 when a pointer is placed on the same respective physical portion of the first graphical element 310. In one of these embodiments, the graphical user interface 300 displays a section 320' in a color distinct from a color in which other sections 320", 320'" in the plurality of sections 320 are displayed. In another of these embodiments, the second graphical element 330 displays past performance of the section 320' in the same color as the color used to display the section 320' in the first graphical element 310.

In some embodiments, a graphical element is displayed with a section in the plurality of sections 320 to convey information about an amount of latency introduced by the corresponding physical section of the connection. In one of these embodiments, a symbol, such as an exclamation point, is placed on the graphical element representing the section 320. In another of these embodiments, if the communication from the host's network introduces greater than 250 ms of delay to the overall latency, a flag, exclamation point, or other symbol indicating a warning, is placed on the graphical element representing the corresponding section 320. In still another of these embodiments, if the communication from the client's network introduces greater than 250 ms of delay to the overall latency, a flag, exclamation point, or other symbol indicating a warning, is placed on the graphical element representing the corresponding section 320.

Figure 3B:
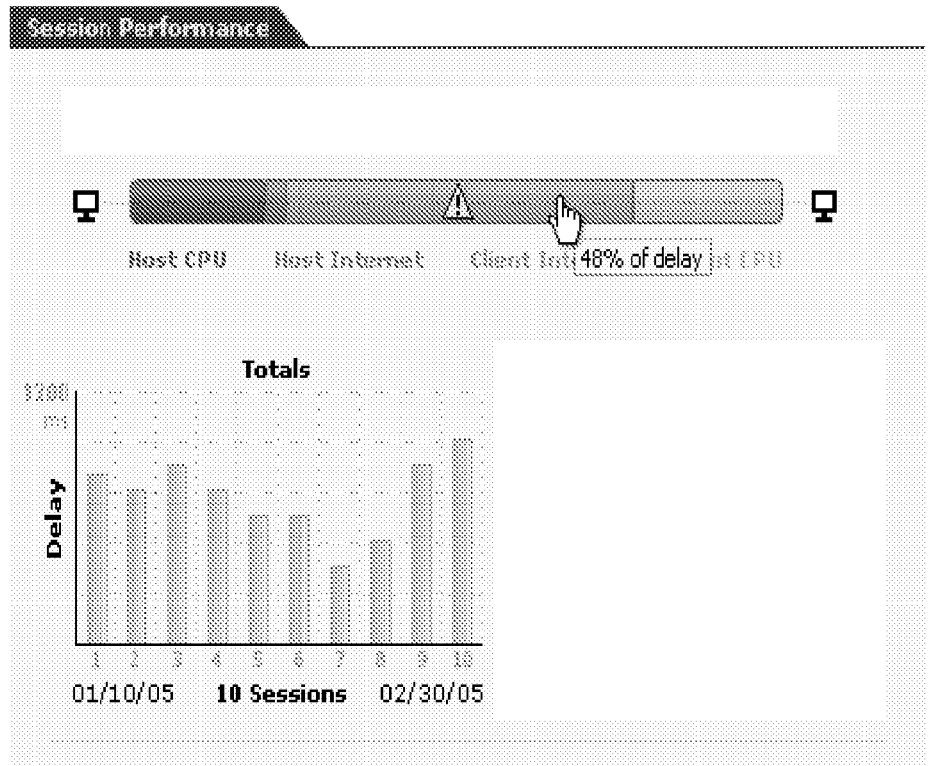
FIG. 3B is a screen shot of an embodiment in which a section in a plurality of sections is displayed by a graphical element of a particular length.

Referring now to FIG. 3B, and in some embodiments, the graphical element 310 displays a section in the plurality of sections 320 by displaying a graphical element of a particular length. In one of these embodiments, the graphical element 310 displays the section in the plurality of sections 320 as having a length in proportion to a percentage of latency caused by a physical section in a connection represented by the section in the plurality of sections 320. For example, and as depicted in FIG. 3B, the client-side communications network has introduced 48% of the delay in the current session.

Referring ahead to FIG. 3B, the graphical user interlace 300 may provide an interactive interface for the user. In this embodiment, the user points a cursor at a section 320'" and receives an indication of an amount of delay introduced by that section; in this case, 48% of the delay is introduced by section 320'".

Referring back to FIG. 3A, the second graphical element 330 displays performance data 340 for a predetermined number of previous sessions between the first computing device and the second computing device. In some embodiments, the second graphical element 330 dynamically displays the past performance of a respective physical portion of the connection when a pointer is placed over the same respective physical portion of the first graphical element. In one of these embodiments, a cursor pointed at a section 320' in the plurality of sections 320 causes the second graphical element 330 to dynamically display the past performance of the section 320'. In other embodiments, a dynamic label is associated with the second graphical element 330.

In some embodiments, and as described in further detail below in connection with FIG. 4C-4D, the graphical user interface 300 includes a third graphical element displaying a rating of the performance of the current communication session relative to a predetermined number of communication sessions. In other embodiments, the graphical user interface 300 includes a menu configured to allow selection of one of the previous sessions displayed by the second graphical element 330 for display in the first graphical element 310. In one of these embodiments, the previous session is selected when an identifier of the previous session displayed in the second graphical element 330 is highlighted.

Figure 3C:
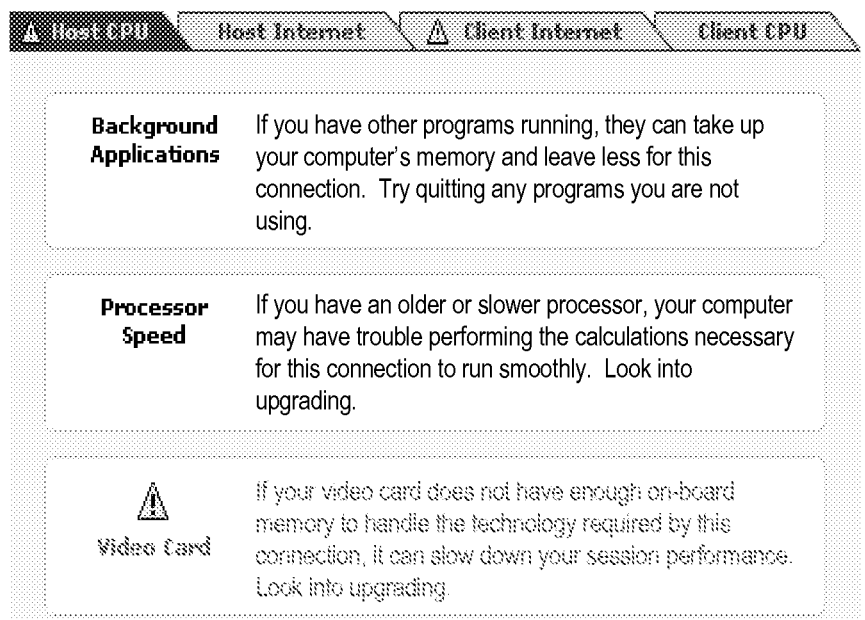
FIG. 3C is a screen shot depicting one embodiment of a graphical element in a graphical user interface displaying a recommendation to improve the performance of a physical section of a client-host connection.

Referring now to FIG. 3C, a screen shot depicts one embodiment of a graphical element in the graphical user interface 300 displaying a recommendation to improve the performance of a physical section of a client-host connection. In one embodiment, the graphical element makes a recommendation with an indication that performance of one of the physical sections crosses a predetermined threshold. In another embodiment, the graphical element makes a recommendation associated with improving a performance of a particular section 320 when the performance of the section 320 crosses the predetermined threshold.

In one embodiment, the graphical user interface 300 is displayed to the second computing node. In another embodiment, the graphical user interface 300 is displayed to the first computing node. In still another embodiment, the graphical user interface 300 is displayed to an intermediate node. In yet another embodiment, the graphical user interface 300 is displayed to a computer unrelated to the performance data or the session. For example, an administrator on a fourth computing device could request and review recommendations for a particular session via the graphical user interface 300.

In one embodiment, the graphical element displays a recommendation retrieved from a database. In another embodiment, the graphical element displays a recommendation provided by an administrator of the system. In still another embodiment, the graphical element displays a recommendation identified by a file downloaded from a server. In yet another embodiment, the graphical element displays a recommendation retrieved from a host node.

In one embodiment, the displayed recommendation comprises an action the viewer of the recommendation can take to improve the performance of a transmission component associated with the recommendation. For example, the graphical element displaying an actionable recommendation to a user may depict a suggestion to upgrade a type of graphics card or network connection type, or may display a suggestion to modify a personal preference.

In some embodiments, the intermediate computing device provides the graphical elements and retrieves the recommendations for display in the graphical element. In other embodiments, a rule is applied to the aggregated measurements to identify a recommendation. In still other embodiments, the graphical element displays the recommendation from the first computing device. In yet other embodiments the graphical element displays the recommendation from the second computing device.

In some embodiments, the recommendation relates to general client-side optimizations. In one of these embodiments, a graphical element recommends closing, minimizing, or pausing animations or videos playing on the client unrelated to the client-host connection. In another of these embodiments, a graphical element recommends exiting from any applications executing on the client and unrelated to the client-host connection. In still another of these embodiments, a graphical element recommends changing a color quality in a preferences menu. In yet another of these embodiments, a graphical element recommends changing a setting of a display resolution on the client.

In other embodiments, the recommendation relates to the client's usage of the internet. In one of these embodiments, a graphical element recommends exiting from any peer-to-peer or file-sharing applications to allocate additional network bandwidth to the client-host connection. In another of these embodiments, a graphical element recommends avoiding downloading or uploading files from the client to the Internet while the client-host connection is active. In still another of these embodiments, a graphical element recommends avoiding the use of streaming media, such as streaming radio, music, video, or Voice over IP applications for the duration of the client-host connection. In yet another of these embodiments, a graphical element recommends determining whether the user has sufficient network bandwidth to maintain the client-host connection, or whether activities of other users on the client network impact the amount of network bandwidth available to the user. In one embodiment, a graphical element recommends changing a type of connection from the wireless connection to a wired connection. In a further embodiment, a graphical element recommends upgrading a type of Internet connection to a type of internet connection providing a higher speed, for example, upgrading from a dial-up connection to a cable modem connection.

In still other embodiments, the recommendation relates to the host computer. In one of these embodiments, a graphical element recommends ensuring that a specific version of a driver for a video card is used. In another of these embodiments, a graphical element recommends lowering a color setting on a host. In still another of these embodiments, a graphical element recommends upgrading a video card. In yet another of these embodiments, a graphical element recommends exiting an application unrelated to the client-host connection, for example, an application using a high percentage of processor resources on the host. In a further embodiment, a graphical element recommends upgrading a host processor to a faster processor.

In yet other embodiments, the recommendation relates to the client computer. In one of these embodiments, a graphical element recommends modifying a window scale preference. In another of these embodiments, a graphical element recommends exiting an application unrelated to the client-host connection, for example, an application using a high percentage of processor resources on the client. In still another of these embodiments, a graphical element recommends upgrading a client processor to a faster processor.

Figure 3D:
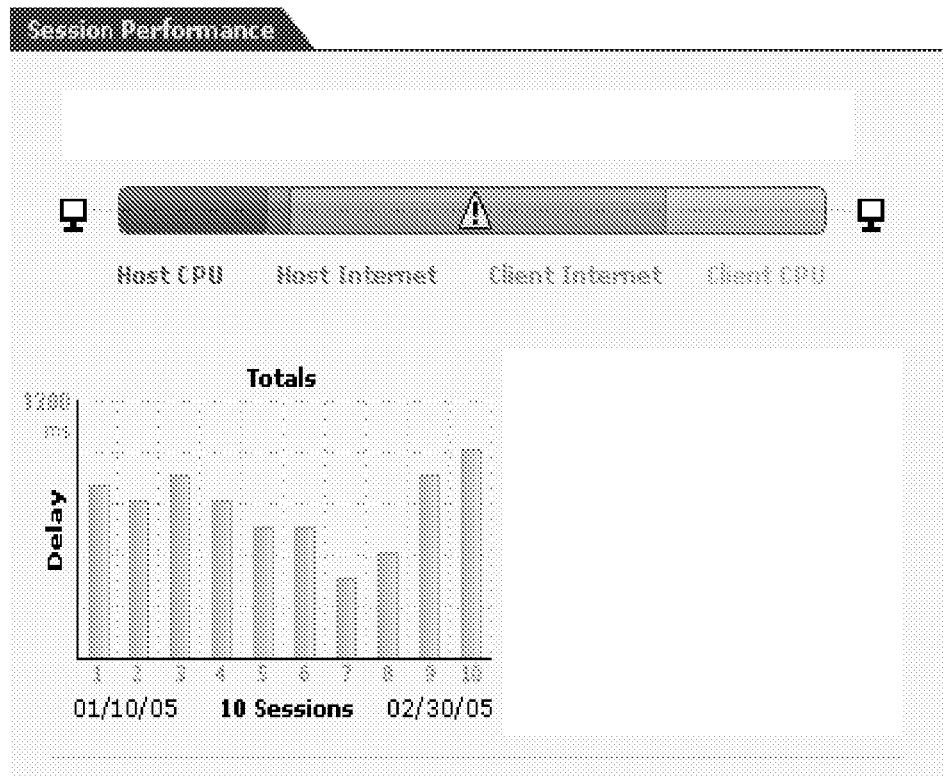
FIG. 3D is a screen shot depicting one embodiment of a graphical user interface that displays performance data related to a communication session between a first computing device and a second computing device.

Referring now to FIG. 3D, a screen shot depicts one embodiment of a graphical user interface displaying performance data related to a communication session between a first computing device and a second computing device. In the embodiment depicted by FIG. 3D, the graphical element 310 is displayed at the top of the graphical user interface and the plurality of sections 320 are displayed in blue with labels identifying each of the sections. In this embodiment, a section in the plurality of sections corresponds to a host computer. Another section corresponds to the physical section between the host computer and the host computer's network. Another section corresponds to the physical section between the host computer's network and a client computer's network. Still another physical section corresponds to the client computer.

In FIG. 3D, the performance data 340 is displayed using a bar chart showing an amount of delay, in milliseconds, per session for each of ten sessions. In one embodiment, the predetermined number of sessions is configurable by a user. In another embodiment, the amount of delay is shown per section 320. For example, the amount of delay introduced by the host computer into a connection between the client computer and the host computer may be displayed for the previous ten sessions between the client computer and the host computer. In another example, an amount of delay introduced by transmission of information from a host computer's network to the client computer's network may be displayed for the previous ten sessions.

Figure 4A:
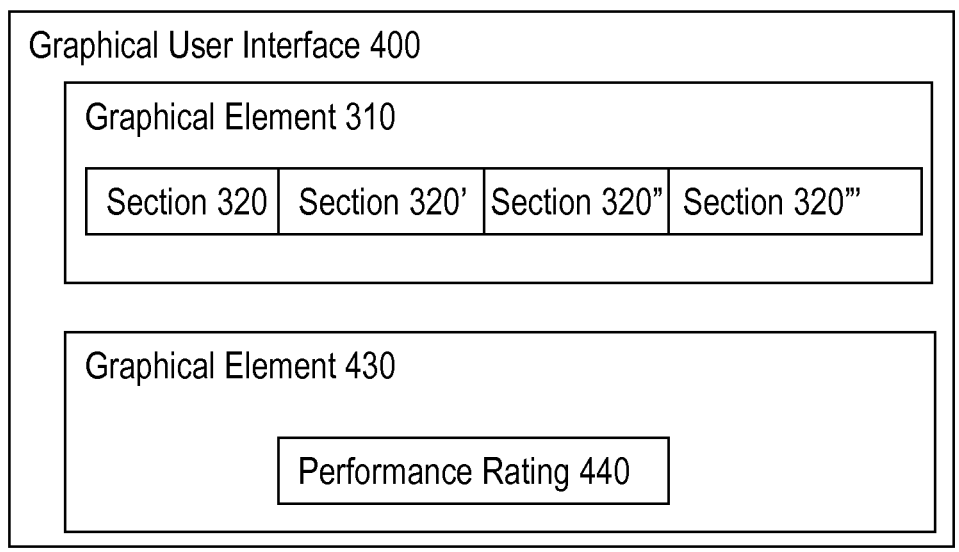
FIG. 4A is a block diagram depicting one embodiment of a graphical user interface that displays a rating of a performance of a current communication session.

Referring now to FIG. 4A, a block diagram depicts one embodiment of a graphical user interface that displays a rating of a performance of a current communication session. In brief overview, a graphical user interface 400 includes a graphical element 310 and a graphical element 430. A described above, the graphical element 310 includes a plurality of sections 320, 320', 320", 320''' that represent a respective physical portion of the connection between the first computing device and the second computing device. The graphical element 430 includes a display of a rating of the performance of the current communication session relative to a predetermined number of communication sessions.

Referring now to FIG. 4A, and in greater detail, the graphical element 430 displays a rating of the performance of the current communication session. In one embodiment, the graphical element 430 dynamically displays the past performance rating of a respective physical portion of the connection when a pointer is placed over the same respective physical portion of the graphical element 310.

In one embodiment, each of the plurality of sections of the first graphical element has a color. In another embodiment, the graphical element 430 dynamically displays the past performance rating of a respective physical portion of the connection in the same color as the same respective physical portion of the graphical element 310 when a pointer is placed of the same respective physical portion of the graphical element 310.

In some embodiments, the graphical user interface 300 is displayed to a user of a second node, such as a client or viewing node. In one of these embodiments, the user requests the display of the graphical user interface 300. In another of these embodiments, the user requests the display via a menu. In still another of these embodiments, the user is required to provide authentication credentials, such as a username and password. In yet another of these embodiments, the user is able to provide feedback regarding the display.

Figure 4B:
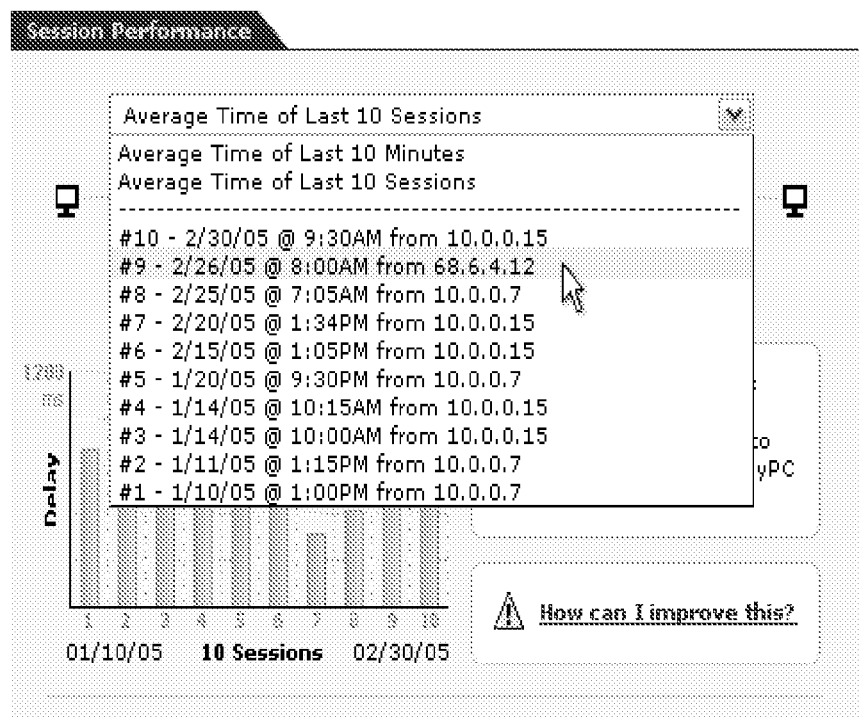
FIG. 4B is a screen shot depicting one embodiment of a graphical user interface displaying a rating of a performance of a current communication session.

Referring now to FIG. 4B, a screen shot depicts one embodiment of a graphical element configured to allow a selection of a previous session for display by the first graphical element. In one embodiment, a menu is configured to allow selection of one of the previous sessions for display by the first graphical element 310. In one embodiment depicted in FIG. 4B, the menu lists each of a predetermined number of sessions. In another embodiment, the graphical element 430 is associated with a dynamic label.

Figure 4C:
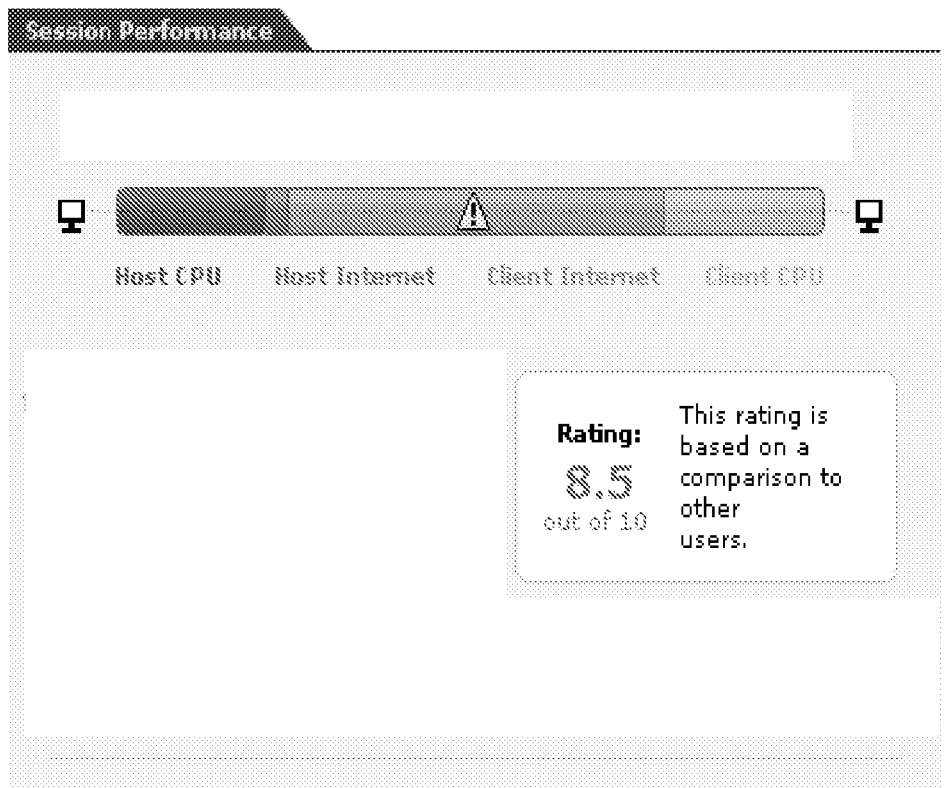
FIG. 4C is a screen shot depicting one embodiment of a graphical user interface displaying performance data related to a communication session between a first computing device and a second computing device and displaying a rating of a performance of a current communication session.

Referring now to FIG. 4C, a screen shot depicts one embodiment of a graphical user interface displaying a rating of a performance of a current communication session. In this embodiment, performance rating 440 is depicted as a rating on a scale of 1-10 of a performance rating of the current session in comparison to performance ratings of current sessions for other users. In the embodiment depicted in FIG. 4B, the rating is an 8.5 out of 10.

Figure 4D:
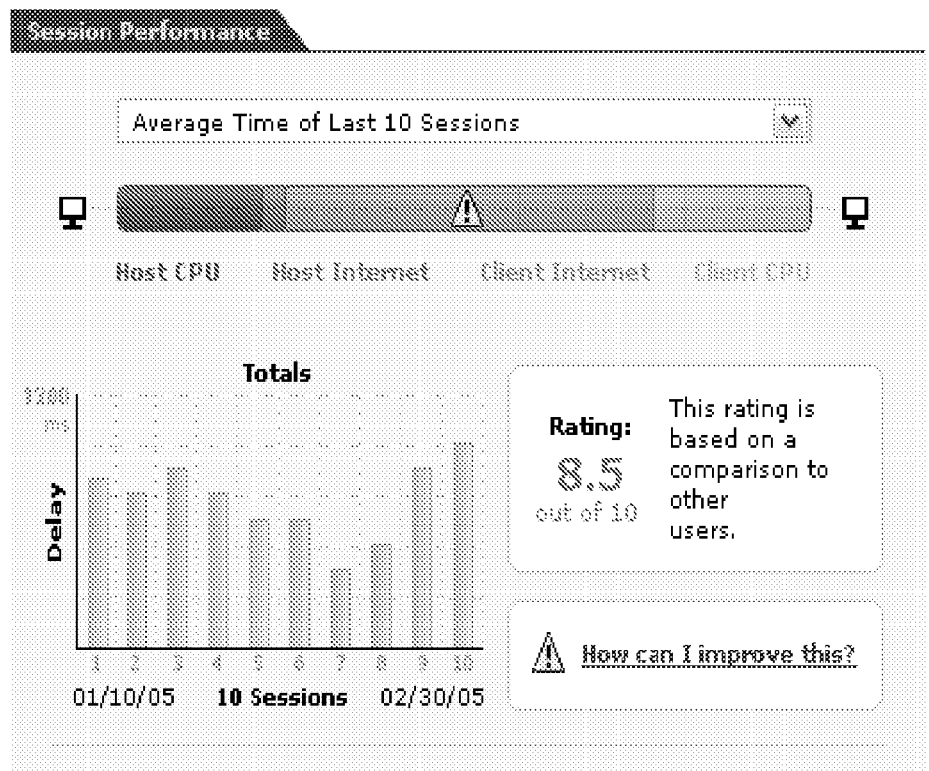
FIG. 4D is a screen shot depicting one embodiment of the graphical user interface which includes a graphical element displaying a rating of a performance of current communication session.

Referring now to FIG. 4D, a screen shot depicts one embodiment of a graphical user interface displaying performance data related to a communication session between a first computing device and a second computing device and displaying a rating of a performance of a current communication session. In this embodiment, the screen shot depicts all the graphical user interface elements described above in connection with FIG. 3A through FIG. 4C. The graphical user interface 300 includes a graphical element 310 with a menu configured to allow selection of a previous session for display in the graphical element 310. The plurality of sections 320 are depicted by graphical elements having lengths in proportion to the amount of delay introduced to the overall connection delay by each of the sections 320. A graphical element indicating a warning is place on the graphical element 320 introducing the greatest amount of delay, in this embodiment, the connection from the host network to the client network. A rating of 8.5 out of 10 is given to the performance data of the current session in comparison to other users' current sessions. A graphical element provides access to a list of recommendation for user optimizations that could improve the connection and the performance data.

Figure 5:
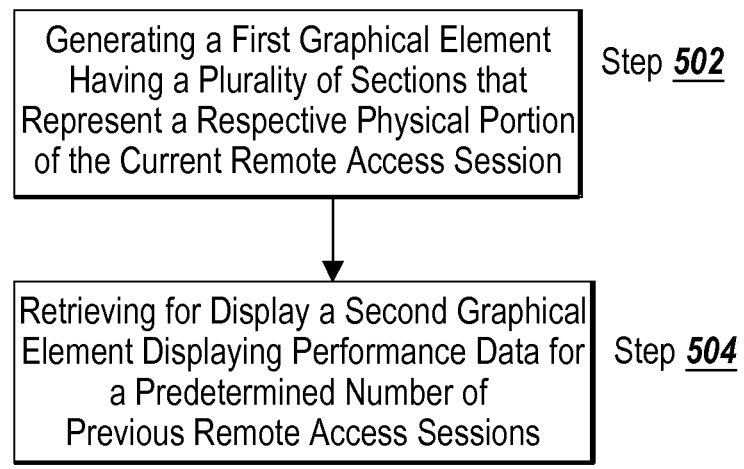
FIG. 5 is a flow diagram depicting one embodiment of the steps taken in a method of displaying performance data related to a current remote access session between a viewer computing device and a host computing device.

Referring now to FIG. 5, a flow diagram depicts one embodiment of the steps taken in a method of displaying performance data related to a current remote access session between a viewer computing device and a host computing device. In brief overview, a first graphical element is generated having a plurality of sections that represent a respective physical portion of the remote access session (step 502). A second graphical element is retrieved, which displays performance data for a predetermined number of previous remote access sessions (step 504).

Referring now to FIG. 5, and in greater detail, a first graphical element is generated having a plurality of sections that represent a respective physical portion of the remote access session (step 502). In one embodiment, the first computing device generates the first graphical element and displays the first graphical element to a user of the second computing device. In another embodiment, the first computing device generates the first graphical element and transmits the first graphical element to an intermediate computing device for display to a user of the second computing device. In another embodiment, the second computing device generates the first graphical element. In still another embodiment, an intermediate computing device generates the first graphical element and displays the first graphical element to a user of the second computing device.

In one embodiment, the plurality of sections comprises sections 320 as described above. In another embodiment, a graphical element is generated for each section in the plurality of sections. In still another embodiment, the graphical element is interactive and a user may request and receive data by selecting a graphical element in the graphical user interface. In yet another embodiment, each of the plurality of sections of the first graphical element is displayed in color.

A second graphical element is retrieved, which displays performance data for a predetermined number of previous remote access sessions (step 504). In one embodiment, the first computing device generates the second graphical element and displays the second graphical element to a user of the second computing device. In another embodiment, the first computing device generates the second graphical element and transmits the second graphical element to an intermediate computing device for display to a user of the second computing device. In another embodiment, the second computing device generates the second graphical element. In still another embodiment, an intermediate computing device generates the second graphical element and displays the second graphical element to a user of the second computing device.

In one embodiment, the first computing device retrieves the second graphical element from a database. In another embodiment, the first computing device retrieves the second graphical element from a file stored on a server 100". In still another embodiment, the first computing device receives the second graphical element from an administrator.

In one embodiment, an intermediate computing device retrieves the second graphical element from a database. In another embodiment, the intermediate computing device retrieves the second graphical element from a file stored on a server 100'". The server 100'" may be a web server. In still another embodiment, the intermediate computing device receives the second graphical element from an administrator.

In some embodiments, the second computing device requests performance data associated with the first computing device. In one of these embodiments, the intermediate computing device retrieves the second graphical element displaying the performance data associated with the first computing device, responsive to the request from the second computing device. In another of these embodiments, the intermediate computing device generates a graphical user interface, including the first graphical element and the second graphical element, and displays the graphical user interface to the second computing device responsive to the request from the second computing device for the performance data associated with the first computing device.

In one embodiment, the second graphical element dynamically displays the past performance of a respective physical portion of the connection when a pointer is placed over the same respective physical portion of the first graphical element. In another embodiment, the second graphical element displays the past performance of a respective physical portion of the connection in the same color as the same respective physical portion of the first graphical element when a pointer is placed of the same respective physical portion of the first graphical element. In still another embodiment, the second graphical element is associated with a dynamic label.

In one embodiment, a menu is configured to allow selection of one of the previous session for display in the first graphical element. In another embodiment, highlighting the selected previous session in the second graphical element triggers selection of the previous session for display in the first graphical element.

In some embodiments, a third graphical element displays a rating of the performance data of the current communication session relative to a predetermined number of communication sessions.

In one embodiment, a graphical element indicates that performance of one of the physical sections is below a predetermined threshold. In another embodiment, a graphical element displays a recommendation for improving the performance of the physical section that is below the predetermined threshold. In some embodiments, an administrator defines the predetermined threshold. In one of these embodiments, the graphical element receives an identification of the predetermined threshold. In other embodiments, the predetermined threshold may be dynamically adjusted, responsive to performance data. In one of these embodiments, the performance data comprises statistical data associated with performance data recorded for previous sessions. In another of these embodiments, the performance data comprises statistical data associated with performance data recorded for sessions provided to other computing devices.

In some embodiments, a computer readable medium having executable instructions thereon causes a graphical user interface to display performance data related to a current remote access session between a viewer computing device and a host computing device. The computer readable medium includes instructions to generate a first graphical element having a plurality of section that represent a respective physical portion of the remote access session. The compute readable medium further includes instructions to generate a second graphical element displaying performance data for a predetermined number of previous remote access sessions.

Figure 6:
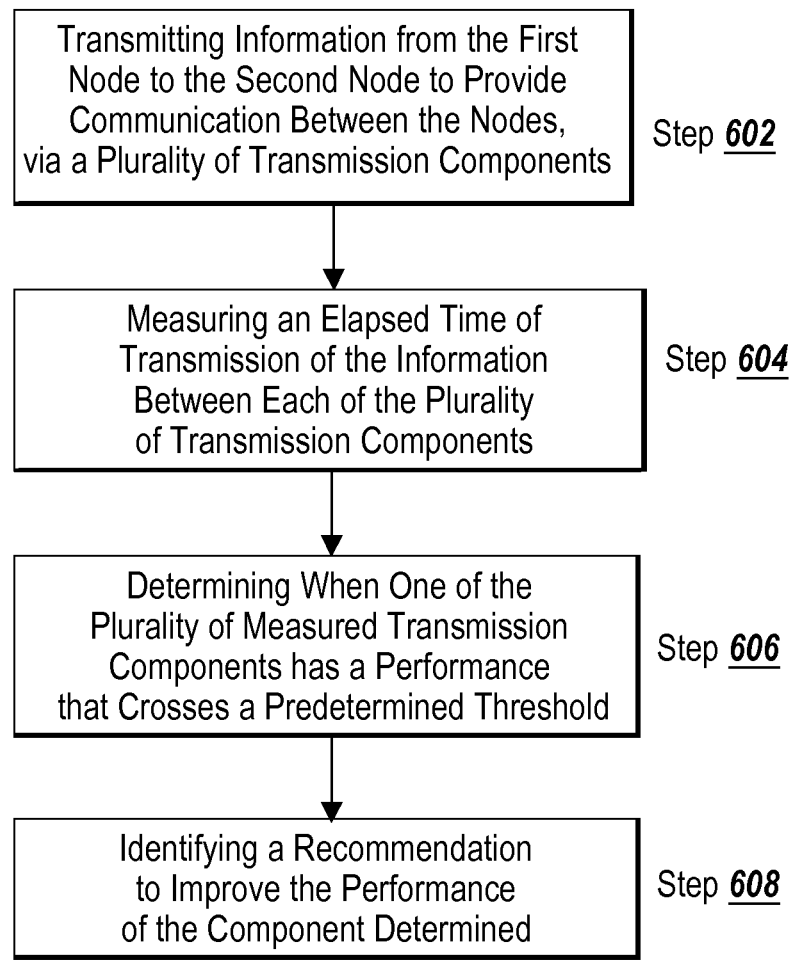
FIG. 6 is a flow diagram depicting one embodiment of the steps taken in a method of providing a performance improvement recommendation for a connection between a first network node in communication with a second network node.

Referring now to FIG. 6, a flow diagram depicts one embodiment of the steps taken in a method of providing a performance improvement recommendation for a connection between a first network node in communication with a second network node. In brief overview, information is transmitted from the first node to the second node, to provide communication between the nodes, via a plurality of transmission components (step 602). An elapsed time of transmission of the information between a subset of the plurality of transmission components is measured, the aggregation of the measurements representing time elapsed for end-to-end transmission of the information that includes preparing, by the first node, the information for transmission and processing, by the second node, the information upon receipt (step 604). A determination is made when one of the plurality of measured transmission components has a performance that crosses a predetermined threshold (step 606). A recommendation is identified to improve the performance of the determined component (step 608).

Referring now to FIG. 6, and in greater detail, information is transmitted from the first node to the second node, to provide communication between the nodes, via a plurality of transmission components (step 602). In one embodiment, the first node is host node. In another embodiment, the second node is a consumer node. In still another node, the first node transmits screen sharing data to the second node. In yet another node, the first node transmits voice data to the second node. In a further embodiment, the first node transmits video data to the second node.

In one embodiment, the first node transmits audio data, such as music files, to the second node. In another embodiment, the first node transmits data to the second node, the data including files transmitted via file transfer protocols. In still another embodiment, the first node transmits mouse and keyboard input data to the second node. In yet another embodiment, the first node transmits information comprising combinations of different types of data, including screen-sharing data, video data, audio data, file transfer data, and mouse and keyboard input data.

In some embodiments, the first node transmits information to the second node via an intermediate node. In one of these embodiments, the intermediate node is referred to as a communication server. In other embodiments, the first node transmits data requesting a measurement of elapsed time from the second node. In one of these embodiments, the first node requests transmission, from the second node to the first node, of measurements taken by the second node regarding elapsed time.

An elapsed time of transmission of the information between a subset of the plurality of transmission components is measured, the aggregation of the measurements representing time elapsed for end-to-end transmission of the information that includes preparing, by the first node, the information for transmission and processing, by the second node, the information upon receipt (step 604). In one embodiment, the plurality of transmission components includes a component for each section of a physical connection between the first node and the second node. In another embodiment, the plurality of transmission components includes one of: a first node, a network accessed by the first node, a second node, and a network accessed by the second node. In still another embodiment, the transmission component includes an intermediate, communications server forwarding information from the first node to the second node. In yet another embodiment, a measurement is taken of the elapsed time of transmission of the information between a subset of the plurality of transmission components, the measurement taken as a percentage of capacity for transmission.

In some embodiments, a timer starts on the first node before the first node delivers a screen change to a queue for transmission to the second node. In one of these embodiments, after complete transmission of the screen change, the second node provides a unique number in an acknowledgement message and transmits the acknowledgement message to the first node. In another of these embodiments, the first node reviews incoming acknowledgement messages and stops the communication timer upon receipt of the acknowledgement message with the modified unique number from the second node.

In some embodiments, the first node takes the measurement of elapsed time of information transmission. In other embodiments, the second node takes the measurement of elapsed time of information transmission. In still other embodiments, an intermediate node takes the measurement of elapsed time of information transmission. In yet other embodiments, a node taking a measurement of elapsed time transmits the measurements to a different node, which displays the measurements to a user via a graphical user interface element.

In one embodiment, a measurement is taken of an elapsed time of information transmission between transmission components selected from the group consisting of: a graphic card performance at one of the first network node and second network node, a network transmission time between the first network node and the second network node, processing data at one of the first network node and second network node, and network transmission time between the second network node and the first network node. In another embodiment, the transmission components are selected from a group consisting of: a graphics card performance at the first node, a time of communication between the host and a network on which the first resides, a time of communication from a network on which the second node resides to the second node, and a processing time at the second node. In still another embodiment, in which an intermediate, communications server receives transmitted information from the first network node and forwards the transmitted information to the second network node, the transmission components are selected from a group consisting of a graphics card performance at the first node, a time of communication between the host and a network on which the first resides, a time of communication from a network on which the second node resides to the second node, and a processing time at the second node.

In some embodiments, a measurement is taken of a performance of a video component of at least one of the first node and the second node. In one of these embodiments, a measurement is taken of a performance of a video capture component. In another of these embodiments, a measurement is taken of a performance of a video compression component. In still another of these embodiments, a measurement is taken of a performance of a component for receiving video. In yet another of these embodiments, a measurement is taken of a performance of a component for decompressing video. In a further of these embodiments, a measurement is taken of a component for receiving video. In still another of these embodiments, a measurement is taken of a component for transmitting video. In even still another of these embodiments, a measurement is taken of a component for resampling video.

In other embodiments, a measurement is taken of a performance of an audio component of at least one of the first node and the second node. In one of these components, a measurement is taken of an audio capture component. In another of these components, a measurement is taken of an audio compression component. In still another of these embodiments, a measurement is taken of an audio decompression component. In yet another of these embodiments, a measurement is taken of a component for receiving audio. In a further of these embodiments, a measurement is taken of a component for transmitting audio. In even still another of these embodiments, a measurement is taken of a component for resampling audio.

In some embodiments, a measurement is taken of a performance of a graphics card of at least one of the first node and the second node. In one of these embodiments, a measurement is taken of a latency introduced when a graphics card on the first node reads a screen change on the first node. In another of these embodiments, a measurement is taken of a time to estimate and perfect a screen change by the graphics card. In still another of these embodiments, the measurement of the graphics card equals the time elapsed between the time before the estimator is called and the time after the perfector returns. In still another of these embodiments, the measurement of the graphics card equals a time elapsed during the preparation of the data for transmission. Preparation of the data may include, without limitation, transforming, sanitizing, resampling, formatting, encoding, compressing, and encrypting data. In yet another of these embodiments, the measurement of the graphics card equals a time elapsed during the processing of the data receiving by the client computing device. Processing of the received data may include, without limitation, transforming, sanitizing, resampling, formatting, encoding, compressing, and encrypting data.

In other embodiments, a measurement is taken of a performance of a CPU of at least one of the first node and the second node. In one of these embodiments, a measurement is taken of a latency introduced by the first node in processing image data. In another of these embodiments, the first node introduces latency when compressing or encrypting image data, such as screen updates, for transmission to the second node.

In one embodiment, a measurement is taken of a performance of transmission of information to a network by the first node. In another embodiment, a measurement is taken of a performance of receiving information from a network at the second node. In still another embodiment, a roundtrip time for a link in the physical connection between the first node and the second node is used to make the measurement. For example, and in some embodiments, if a roundtrip time for information transmitted between a first node and an intermediate node is twice as high as a roundtrip time for information transmitted between the intermediate node and a second node, $\frac{2}{3}$ of the latency may be introduced by the link between the first node and the intermediate node and $\frac{1}{3}$ of the latency may have been introduced by the link between the intermediate node and the second node. In other embodiments, additional bandwidth tests are implemented to improve the accuracy of the latency measurements.

In one embodiment, a measure is taken of a latency introduced when the second node processes screen changes. In another embodiment, a measurement is taken when the second node decrypts and decompresses a received screen change. In still another embodiment, a measurement is made of an elapsed time between receipt of a screen update and display of a received screen update.

In some embodiments, the measurements, referred to as performance values, are averaged over periods of time. In other embodiments, the measurements, referred to as performance values, are aggregated over predetermined intervals. In one of these embodiments, the measurements are aggregated over one-minute intervals. In another of these embodiments, the measurements are aggregated over five-minute intervals. In still another of these embodiments, the measurements are aggregated over ten-minute intervals. In yet another of these embodiments, the measurements are aggregated over fifteen-minute intervals. In a further of these embodiments, the measurements are aggregated over thirty-minute intervals.

In one of these embodiments, the measurements are aggregated over one-hour intervals. In another of these embodiments, the measurements are aggregated over six-hour intervals. In still another of these embodiments, the measurements are aggregated over eighteen-hour intervals. In yet another of these embodiments, the measurements are aggregated over twenty-four intervals. In some of these embodiments, the performance values are transmitted to the first node every interval.

In some embodiments, supplemental measurements are taken. In one of these embodiments, a measurement is taken of a number of bytes and updates processed over time, which may be referred to as throughput. In another of these embodiments, a supplemental measurement is taken to measure an amount of bandwidth available in a connection between the first node and the second node.

In one embodiment, a supplemental measurement is taken to identify latency in transmitting information from the first node to an intermediate node, such as a communications server. In another embodiment, supplemental measurements are taken to identify latency in the roundtrip time required to transmit information between the intermediate server and the second node. In still another embodiment, supplemental measurements are taken to identify latency in the roundtrip time required to transmit information between the first node and the second node. In some embodiments, the first node initiates the supplemental measurements.

In one embodiment, a measurement of jitter in a roundtrip time latency measurement may provide an indication of packet loss in a particular connection. In another embodiment, supplemental measurements are taken to identify an amount of latency jitter for the communications between the first node and the intermediate server. In still another embodiment, supplemental measurements are taken to identify an amount of latency jitter for the communications between the intermediate server and the second node. In yet another embodiment, supplemental measurements are taken to identify an amount of latency jitter for the communications between the first node and the second node.

In one embodiment, graphics card performance, audio performance, video performance, and host performance measurements are computed and stored on the first node. In another embodiment, end-to-end communication time for screen updates is measured and computed on an application-level. In still another embodiment, a communications agent on an intermediate server provides an interface for querying communications statistics for use in determining inter-process communication measurements. In yet another embodiment, the communications agent resides on the first node. In a further embodiment the inter-process communication refers to a plurality of processes that transmit data from the first node to the second node, including, but not limited to, processes that capture screen data and processes that transmit captured screen data to the second node over a network.

In one embodiment, aggregate performance data received from the second node are stored on the first node. In another embodiment, the first node computes a running average of averages of the performance of the second node for a session. In some embodiments, the first node transmits stored measurements and statistics to a third node for storage. In one of these embodiments, the third node generates a graphical user interface displayed to the user. In another of these embodiments, the third node generates the graphical user interface 300 described above in connection with FIGS. 3-5.

In some embodiments, supplemental measurements are taken regarding audio device measurements. In one of these embodiments, supplemental measurements are taken of an audio capture component. In another of these embodiments, supplemental measurements are taken of audio performance. In still another of these embodiments, supplemental measurements are taken of performance of an audio compression component. In still another of these embodiments, supplemental measurements are taken of performance of an audio decompression component. In yet another of these embodiments, supplemental measurements are taken of audio resolution rates, such as bits per sample. In a further of these embodiments, supplemental measurements are taken of audio sampling rates. In one embodiment, supplemental measurements are taken regarding audio encoding and compression formats, available formats, and available compression ratios.

In other embodiments, supplemental measurements are taken regarding video device measurements. In one of these embodiments, supplemental measurements are taken of a video capture component. In another of these embodiments, supplemental measurements are taken of video performance. In still another of these embodiments, supplemental measurements are taken of performance of a video compression component. In still another of these embodiments, supplemental measurements are taken of performance of a video decompression component. In yet another of these embodiments, supplemental measurements are taken of video resolution rates. In a further of these embodiments, supplemental measurements are taken of video frame rates. In one embodiment, supplemental measurements are taken regarding video compression rates and compression formats.

In some embodiments, supplemental measurements are taken regarding screen information. In one of these embodiments, a supplemental measurement is taken to identify a resolution of a screen accessed by the first node. In another of these embodiments, a supplemental measurement is taken to identify a resolution of a screen accessed by the second node: In still another of these embodiments, a supplemental measurement is taken to identify a compression format of a screen accessed by the first node. In yet another of these embodiments, a supplemental measurement is taken to identify a compression mode of a screen accessed by the second node. In others of these embodiments, a supplemental measurement is taken to identify a color depth of a screen accessed by the first node. In still others of these embodiments, a supplemental measurement is taken to identify a color depth of a screen accessed by the second node. In yet others of these embodiments, a supplemental measurement is taken to identify information associated with a display adapter on one of the first node and the second node, the information including, but not limited to a name of the adapter, a driver of the adapter, and a version of the adapter.

In one embodiment, supplemental measurements are added to a measurement identifying latency between two of the transmission components in the plurality of transmission components. In another embodiment, supplemental measurements are added to a measurement identifying an aggregate update latency representing an amount of latency in the elapsed time for end-to-end transmission of information from a first node to a second node.

In some embodiments, the measurements are aggregated at predetermined intervals. In one of these embodiments, the predetermined interval is a session, such as a screen-sharing session between a host node and a client node. In another of these embodiments, the predetermined interval is one minute. In still another of these embodiments, the predetermined interval is configurable by a user.

In one of these embodiments, the measurements are aggregated over five-minute intervals. In another of these embodiments, the measurements are aggregated over ten-minute intervals. In still another of these embodiments, the measurements are aggregated over fifteen-minute intervals. In yet another of these embodiments, the measurements are aggregated over thirty-minute intervals.

In one of these embodiments, the measurements are aggregated over one-hour intervals. In another of these embodiments, the measurements are aggregated over six-hour intervals. In still another of these embodiments, the measurements are aggregated over eighteen-hour intervals. In yet another of these embodiments, the measurements are aggregated over twenty-four intervals. In some of these embodiments, the performance values are transmitted to the first node every interval.

In one embodiment, the aggregated measurements represent elapsed time between detection of a screen change on a host node and display of the screen change on the client node. In another embodiment, the aggregated measurement is referred to as update latency. In still another embodiment, the aggregated measurement comprises a main factor in a level of user-perceived quality of an interactive experience. In yet another embodiment, the aggregated measurement comprises a metric for the quality of a session.

In some embodiments, the measurements are aggregated to determine average or median update latency. In other embodiments, a standard deviation is computed for all measurements. In one of these embodiments, the standard deviation is used to identify packet loss from a measurement of roundtrip link latency.

In some embodiments, the measurements are aggregated over large intervals, such as sessions. In other embodiments, the measurements are aggregated over short intervals of time. In still other embodiments, the aggregated measurement comprises a metric for the overall session quality or the quality of the session at a point in time, depending on the time scale used when making the component measurements.

A determination is made when one of the plurality of measured transmission components has a performance that crosses a predetermined threshold (step 606). In one embodiment, an aggregate measurement comprises an indication of a performance of a transmission component for a particular session. In another embodiment, an aggregate measurement identifies an elapsed time below a predetermined threshold. In some embodiments, the predetermined threshold identifies a maximum amount of latency acceptable for a connection between the first and second nodes. In one of these embodiments, an aggregate measurement below the predetermined threshold indicates a positive performance for the transmission component introducing the latency into the connection, a performance without excessive amounts of latency, as defined by the predetermined threshold. In another of these embodiments, an aggregate measurement above the predetermined threshold indicates a negative performance.

In one embodiment, a transmission component having a performance in excess of a predetermined threshold has required an elapsed time for transmission of information crossing a threshold of acceptable elapsed time. In another embodiment, a transmission component having a performance crossing a predetermined threshold has introduced an amount of latency into an overall amount of latency in excess of a predetermined threshold of acceptable latency. In still another embodiment, the predetermined threshold identifies an amount of time acceptable for transmission of information from a first node, such as a host node, to a second node, such as a client node. In yet another embodiment, the predetermined threshold identifies an amount of latency acceptable in an amount of time required to provide an update of a screen change on a first node, such as a host node, to a second node, such as a client node. In some embodiments, transmission components requiring periods of time crossing the predetermined threshold to transmit information require remediation. In other embodiments, users require information regarding remediation or optimization upon identification of transmission components requiring periods of time crossing the predetermined threshold to transmit information.

In one embodiment, a rating is provided for the level of performance indicated by the aggregate measurements. In another embodiment, if an average update latency of a particular transmission component is greater than an average of update latency for all sessions in a predetermined period of time plus twice a standard deviation for all sessions, the rating is poor. A poor rating may be denoted by a zero in a numerical rating, or a graphical element displayed in red within a graphical user interface, such as the graphical user interface 300 described above.

In another embodiment, if an average update latency of a particular transmission component is less than an average of update latency for all sessions in a predetermined period of time minus a standard deviation for all sessions, the rating is excellent. An excellent rating may be donated by a ten in a numerical rating, or a graphical element displayed in green within a graphical user interface, such as the graphical user interface 300 described above.

In still another embodiment, a rating is given a numerical value equal to ten times the quantity of one minus the quantity of the quantity of an average update latency of a particular transmission component minus an average update latency for all sessions in a predetermined period of time plus one standard deviation, divided by the quantity of three times the standard deviation. In some embodiments, a range of colors is assigned to a range of numerical ratings, such as yellow for graphical elements representing transmission components having numerical ratings between 2.1 and 4, or varying shades of green for graphical elements representing transmission components having numerical ranges between 4.1 and 6, between 6.1 and 8 and between 8.1 and 10.

A recommendation is identified to improve the performance of the determined component (step 608). In one embodiment, historical data is accessed for a subset of the plurality of measured components and the recommendation is provided in response to the historical data. In another embodiment, the identified recommendation is provided to a user via a graphical user interface, such as the graphical user interface 300 described above in connection with FIGS. 3-5.

In one embodiment, the measurement of the elapsed time of transmission of information between the plurality of transmission components is transmitted to a server for storage. In another embodiment, a stored measurement of elapsed time provides the basis for historical data regarding performance of a particular component in the plurality of transmission components.

In one embodiment, the measurement of elapsed time of transmission of information is displayed graphically. In another embodiment, a graphical user interface, such as the graphical user interface 300 described above, displays the measurement of elapsed time. In still another embodiment, historical data is accessed for a subset of the plurality of transmission components and the historical data is displayed graphically.

In some embodiments, the recommendation relates to general client-side optimizations. In other embodiments, the recommendation relates to the client's usage of the internet. In still other embodiments, the recommendation relates to the host computer. In yet other embodiments, the recommendation relates to the client computer. The recommendations may be of the type described above in connection with FIGS. 3-5.

In some embodiments, a computer readable medium having executable instructions thereon to cause the providing of a performance improvement recommendation for a connection between a first network node in communication with a second network node is provided. The computer readable medium comprises instructions to transmit information from the first node to the second node to provide communication between the nodes, via a plurality of transmission components. The computer readable medium also comprises instructions to measure an elapsed time of transmission of the information between each of the plurality of transmission components, the aggregation of the measurements representing time elapsed for end-to-end transmission of the information that includes preparing, by the first node, the information for transmission and processing, by the second node, the information upon receipt. The computer readable medium further comprises instructions to determine when one of the plurality of measured transmission components has a performance that crosses a predetermined threshold. The computer readable medium additionally comprises instructions to identify a recommendation to improve the performance of the component determined by the instructions to determine when a performance crosses a predetermine threshold.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and interfaces for displaying performance data related to a current remote access session, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system comprising:
    one or more processors; and
    a memory comprising instructions which, when executed by the one or more processors, cause the one or more processors to:
        present, at one or more display devices, a graphical user interface that displays performance data related to a communication session between a first computing device and a second computing device, the graphical user interface comprising:
            a first graphical element having a plurality of sections that each separately represent a respective physical portion of a connection between the first computing device and the second computing device and that together represent an entire physical connection between the first computing device and the second computing device, each of the sections displaying the performance data for a current session for that respective physical portion, and each of the sections having a variable length that changes relative to a change in the performance data caused by the respective physical portion of the section; and
            a second graphical element displaying performance data for a predetermined number of previous sessions between the first computing device and the second computing device, the second graphical element being configured to dynamically display a past performance of a given physical portion of the connection between the first computing device and the second computing device when a pointer is placed over the section in the first graphical element representing the given physical portion.

2. The graphical user interface of claim 1, wherein each of the plurality of sections of the first graphical element has a color.

3. The graphical user interface of claim 2, wherein the second graphical element dynamically displays the past performance of a respective physical portion of the connection in the same color as the same respective physical portion of the first graphical element when a pointer is placed of the same respective physical portion of the first graphical element.

4. The graphical user interface of claim 1, wherein the second graphical element dynamically displays the past performance of a respective physical portion of the connection when a pointer is placed over the same respective physical portion of the first graphical element.

5. The graphical user interface of claim 1 further comprising a dynamic label associated with the second graphical element.

6. The graphical user interface of claim 1 further comprising a graphical element indicating that performance of one of the physical sections is below a predetermined threshold.

7. The graphical user interface of claim 6 further comprising a recommendation graphical element that displays a recommendation to improve the performance of the physical section that is below the predetermined threshold.

8. The graphical user interface of claim 1 further comprising a menu configured to allow selection of one of the previous session for display as the first graphical element.

9. The graphical user interface of claim 8 wherein the selected previous session is highlighted in the second graphical element.

10. The graphical user interface of claim 1 further comprising a third graphical element displaying a rating of the performance of the current communication session relative to a predetermined number of communication sessions.

11. A system comprising:
    one or more processors; and
    a memory comprising instructions which, when executed by the one or more processors, cause the one or more processors to:
        present, at one or more display devices, a graphical user interface that displays performance data related to a communication session between a first computing device and a second computing device, the graphical user interface comprising:
            a first graphical clement having a plurality of sections that each separately represent a respective physical portion of a connection between the first computing device and the second computing device and that together represent an entire physical connection between the first computing device and the second computing device, each of the sections displaying the performance data for a current session for that respective physical portion, and each of the sections having a variable length that changes relative to a change in the performance data caused by the respective physical section; and
            a second graphical element displaying a rating of a performance of the current communication session relative to a predetermined number of communication sessions, the second graphical element being configured to dynamically display a past performance rating of a given physical portion of the connection between the first computing device and the second computing device when a pointer is placed over the section in the first graphical element representing the given physical portion.

12. The graphical user interface of claim 11 further comprising a graphical element indicating that performance of one of the physical sections is below a predetermined threshold.

13. The graphical user interface of claim 12 further comprising a recommendation graphical element that displays a recommendation to improve the performance of the physical section that is below the predetermined threshold.

14. The graphical user interface of claim 11, wherein each of the plurality of sections of the first graphical element has a color.

15. The graphical user interface of claim 14, wherein the second graphical element dynamically displays the past performance rating of a respective physical portion of the connection in the same color as the same respective physical portion of the first graphical element when a pointer is placed of the same respective physical portion of the first graphical element.

16. The graphical user interface of claim 11, wherein the second graphical element dynamically displays the past performance rating of a respective physical portion of the connection when a pointer is placed over the same respective physical portion of the first graphical element.

17. The graphical user interface of claim 11 further comprising a dynamic label associated with the second graphical element.

18. The graphical user interface of claim 11 further comprising a menu configured to allow selection of one of the previous session for display as the first graphical element.

19. A method of displaying performance data related to a current remote access session between a viewer computing device and a host computing device, the method comprising:
   (a) generating a first graphical element having a plurality of sections that each separately represent a respective physical portion of the current remote access session and that together represent an entire physical connection between the viewer computing device and the host computing device, each of the sections displaying the performance data for a current session for that respective physical portion, and each of the sections having a variable length that changes relative to a change in the performance data caused by the respective physical portion of the section; and
   (b) retrieving for display a second graphical element displaying performance data for a predetermined number of previous remote access sessions between the viewer computing device and the host computing device, the second graphical element being configured to dynamically display a past performance of a given physical portion of the connection between the viewer computing device and the host computing device when a pointer is placed over the section in the first graphical element representing the given physical portion.

20. The method of claim 19 further comprising the step of displaying, by a third graphical element, a rating of the performance data of the current communication session relative to a predetermined number of communication sessions.

* * * * *